MAGNETIC SWITCH CIRCUIT

Filed Jan. 24, 1963 5 Sheets-Sheet 1

INVENTORS
HEWITT D. CRANE
BY WILLIAM K. ENGLISH

Curtis, Morris & Safford

INVENTORS
HEWITT D. CRANE
BY WILLIAM K. ENGLISH
Curtis, Morris + Safford

*INVENTORS*
HEWITT D. CRANE
*BY* WILLIAM K. ENGLISH

Curtis, Morris + Safford

MAGNETIC SWITCH CIRCUIT

Filed Jan. 24, 1963 5 Sheets-Sheet 4

*INVENTORS*
HEWITT D. CRANE
*BY* WILLIAM K. ENGLISH

Curtis, Morris + Safford

Nov. 29, 1966 H. D. CRANE ETAL 3,289,185

MAGNETIC SWITCH CIRCUIT

Filed Jan. 24, 1963 5 Sheets-Sheet 5

INVENTOR.
HEWITT D. CRANE
BY WILLIAM K. ENGLISH

Curtis, Morris + Safford

United States Patent Office 3,289,185
Patented Nov. 29, 1966

3,289,185
MAGNETIC SWITCH CIRCUIT

Hewitt D. Crane, Palo Alto, and William K. English, Menlo Park, Calif., assignors to AMP Incorporated, Harrisburg, Pa.

Filed Jan. 24, 1963, Ser. No. 253,722
24 Claims. (Cl. 340—174)

This invention relates to an improved magnetic switch of the type employed to connect selectively communication signal paths.

Magnetic core switches have been developed which have no moving parts and which exhibit an almost infinite one-off stability without requiring holding current. A typical switch of this type is shown and described in U.S. patent application Serial No. 144,790, to H. D. Crane et al. now abandoned. While such switches represent a significant improvement over mechanical or other solid state devices and are now satisfactory in operation, production and application experience has demonstrated the need for further improvement.

Generally, the considerable advantages inherent in employing an electronic component having only magnetic material and conductors are somewhat offset by the operational limitations of necessary peripheral equipment. Thus, while the magnetic core and windings of a magnetic switch may be expected to have an almost infinite life, the transistors, resistors, diodes and other components utilized in switch driving circuits have not only a finite life but have operational characteristics which vary substantially with the age of the component.

Additionally, such components invariably differ in operating characteristics due to manufacturing tolerances with the result that for any given circuit both temporary and permanent variations in output may be expected. Since the magnetic switch is heir to shortcomings of supporting equipment and is itself a non-linear device, such variations may be expected to be present if not magnified in the switch operating characteristics.

As a more specific consideration, applications involving the use of known magnetic switches to accommodate either audio or machine intelligence demanding either low distortion over a bore frequency range or at least low degradation with respect to a high speed switching cycle have revealed shortcomings inherent in the switching technique presently employed. One such shortcoming is caused by the limited range of linear operation inherent in the particular coupling and output circuit presently employed, which limitation results in either an increase in distortion or in a substantial reduction of the permissable range of signal amplitude passed by the switch. Another shortcoming is tied to the fact that the carrier signal and output circuit employed in known magnetic switches produces a not insubstantial output when the switch is on with no signal applied or when the switch is off. This, of course, adversely affects both the on-off ratio and the signal-to-noise ratio of the device. Furthermore, it appears that there is a substantial and unfilterable transient noise produced when the switch of the prior art is driven from the off to the on state. Because of these factors, the total utility of magnetic switches made in accordance with the prior art is considerably less than might be expected in view of the intrinsic qualities of the switch.

Accordingly, it is one object of the present invention to provide a multi-path magnetic switch for interconnecting communication signal paths which is inherently insensitive to the normal voltage-current variations of switch driving circuits.

It is a further object of invention to provide an improved magnetic switch circuit requiring fewer driver components than heretofore possible.

It is a further object of the present invention to provide an improved magnetic switch capable of connecting communication signal paths with an insubstantial addition of switch noise to such paths.

It is a still further object of invention to provide a magnetic core switch circuit having an improved signal to noise ratio and having a reduced noise level in both the on and off condition.

It is another object of invention to provide a magnetic switch having an improved range of linear operation relative to signal amplitude and frequency.

It is yet another object to provide a magnetic switch of improved characteristics which is less expensive than switches of similar function heretofore available.

It is still another object of invention to provide an improved gain control for magnetic switches.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustrtaion in order that others skilled in the art may fully understand the invention and the principles thereof and the manner of applying it in practical use so that they may modify it in various forms, each as may be best suited to the conditions of a particular use.

The foregoing objects are attained by the present invention through the use of a novel output circuit capable of developing a self-bias to thus eliminate the need for asymmetrical drive and capable of developing opposed drive voltage components to thus eliminate the affects of driver voltage variations. By eliminating the requirement for drive bias, the circuit of the invention may be driven by less components than heretofore possible and an incidental but important wiring simplification may be accomplished. By making the magnetic switch of the invention less sensitive to drive and load voltage variations, the operational range of the switch may be extended without loss in quality of function. Through the use of the balanced output scheme the circuit of the invention may be operated to switch communication paths with an improved signal-to-noise ratio, with improved on-off ratio and without the turn-on "thump" characteristic of prior art devices. Finally, by the use of a variable bias source adaptable to change the symmetry of drive to achieve a unique variable gain control.

Figure 1:
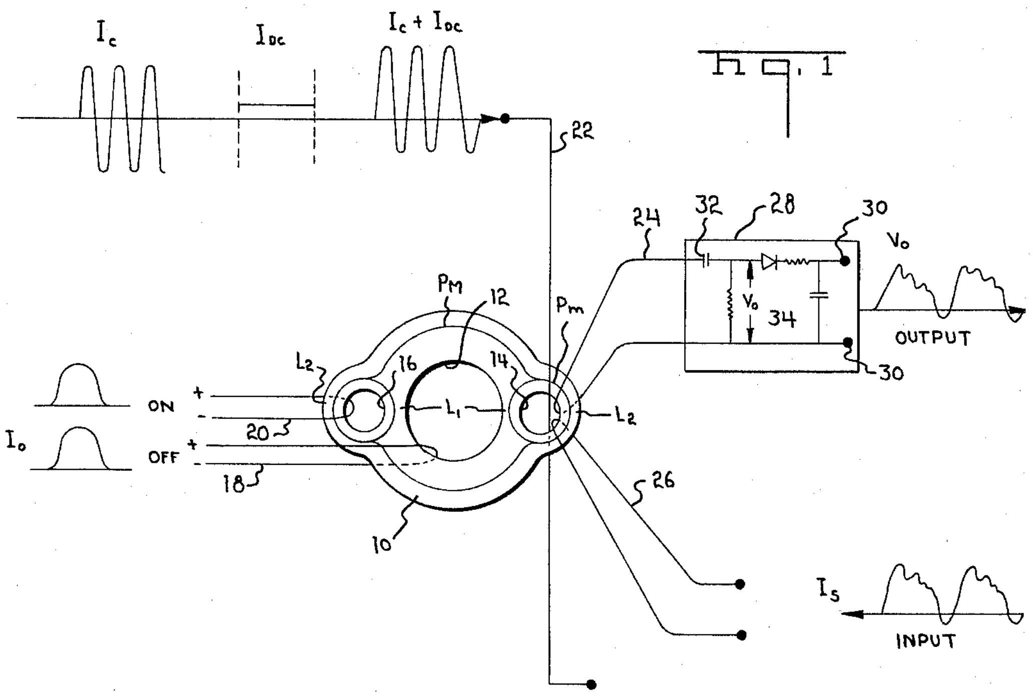
FIGURE 1 is a schematic diagram of a magnetic core switch circuit of the prior art included to explain the operation of the device of the invention.

Referring now to FIGURE 1, there is shown a magnetic core and core switching circuit enlarged approximately ten times actual size. Core 10 may be considered as a typical ferrite magnetic member having the familiar bistable characteristics frequently represented by a square loop hysteresis characteristic curve. Core 10 includes a major aperture 12 and minor apertures 14 and 16 which serve to define paths of possible flux closure within the magnetic material of the core. The core 10 may additionally be considered as having inner and outer legs of magnetic material $L_1$ and $L_2$ of substantially equal cross-sectional area which with respect to a current carrying conductor, serve to define distinct thresholds for distinct paths of flux closure about the core apertures 12, 14 and 16. Dependent upon the placement of a current carrying conductor with respect to legs $L_1$ and $L_2$, core 10 may be driven by applied MMF into a number of distinct stable states of magnetization characterized by different orientations of flux closure in the paths denominated $P_M$ and $P_m$. One stable state may be thought of as the off or "clear" state wherein the orientation of flux is in closure in $P_M$ in a clockwise direction as viewed from the major aperture 12. An alternate stable state may be thought of as the on or "set" state wherein there is an opposite orientation of flux in $P_M$ about aperture 12; the material in the outer path including $L_2$ being substantially negatively saturated and the material in the inner path including $L_1$ being positively saturated. The on-off control for core 10 is achieved by windings 18 and 20 which encircle, respectively, different portions of the core; the off control winding 18 encircles the body of the core including inner and outer legs $L_1$ and $L_2$ and the on control winding 20 encircles only the outer path including leg $L_2$. Considering that each of the windings 18 and 20 include a number of turns, N, a current $I_0$ may be applied to either winding having an amplitude and duration such that $NI_0$ exceeds the material threshold of the path or paths linked by the windings. In this manner, the above described stable states may be achieved by the selective application of $I_0$ to one or the other windings 18 or 20.

It is a characteristic of the multi-aperture magnetic core that the minor aperture threshold, when the core is in the on or disturbed state, is substantially less than the major aperture threshold. When the core is in the off or negatively saturated state, it is upon this characteristic that on-off switch operation is based. Linking minor aperture 14 is a drive winding 22 connected to be energized by a source capable of producing a rapidly reversing RF or carrier current $I_c$ which may be supplied from a standard source. Considering that winding 22 threads aperture 14 by a number of turns N the amplitude of $I_c$ is made such that $NI_c$ is less than the threshold of the path $P_M$ but greater than the threshold of path $P_m$ when the core is in the on state. The application of $I_c$ may thus be considered to switch remanent or inelastic flux about path $P_m$ encircling aperture 14 when the core is in the on state but switch only elastic flux in such path when the core is in the off state.

Also linking aperture 14 about leg $L_2$ is a further winding 26 adapted to apply an input signal $I_s$ and an output winding 24 adapted to drive a detector 28 capable of producing a voltage $V_0$ representative of the input signal $I_s$. As is well understood, winding 24 by encircling leg $L_2$ will produce an induced voltage which is proportional to the rate of change of flux under such winding. The input signal $I_s$ produces an M.M.F. operating on path $P_m$ resulting in modulation of the flux switched by $I_c$. The induced voltage on winding 24 may be thereby related to the input signal $I_s$ and, after elimination of the detected component of $I_c$ on detector 28, employed to develop an output voltage $V_0$ representative of the input signal. By maintaining the maximum swing and duration of the combined M.M.F. produced by $I_c$ and $I_s$ to a value substantially less than the point of either positive or negative saturation of the material path about aperture 14, the amount of flux switched may be held in a linear relationship with the input signal $I_s$. The frequency of $I_c$ is made sufficiently high to produce a number of flux reversals per unit of time to provide an adequate voltage in the output circuit and should be substantially greater than the highest frequency of the input signal $I_s$.

Figure 1A:
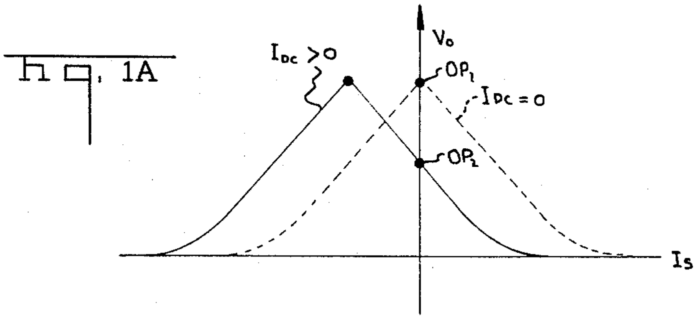
FIGURE 1A is a representation of the input-output characteristic curve of the switch shown in FIGURE 1.

The circuit of FIGURE 1 as thus far described will operate to interconnect the communication paths represented by windings 26 and 24 when core 10 is in the on state and to disconnect such paths when core 10 is in the off state. As shown by the circuit characteristic curve denominated $I_{dc}=0$ in FIGURE 1A, the input-output operation of the circuit would be about operating point $OP_1$, which would result in an unsatisfactory operation. Consider, for example, the output wave form $V_0$ responsive to the input of a single cycle of $I_s$ in the form of a simple sign wave. Since $V_0$ decreases with an increase of $I_s$ or with a decrease of $I_s$ on both sides of operating point $OP_1$, the wave form of $V_0$ has two negative pulses per cycle of $I_s$. Thus, the output of the detector 28 appears at twice the frequency of the input signal. Because of this, with the circuit of FIGURE 1, it is necessary to provide a bias current operating to bias $I_c$ and form an asymmetric input on winding 22. With such bias applied, the characteristic curve denominated $I_{dc}>0$ may be achieved with an operating point $OP_2$ placing a relatively linear portion of the curve across the $I_s=0$ point of operation. In this manner, frequency doubling may be avoided and the output voltage $V_0$ may be made to linearly track the input signal $I_s$.

The circuit of FIGURE 1, including the amplitude modulated signal detector of conventional design, while generally satisfactory is subject to the shortcomings described above. More specifically, the circuit of FIGURE 1 demands at least two drivers, including a source for $I_c$ and a source for $I_{dc}$. Voltage variations in either such sources will, of course, affect the output signal $V_o$, both directly and indirectly by affecting the input-ouput characteristic curve. Furthermore, since the core even in its off state includes a path $P_m$ containing switchable elastic flux as well as a certain amount of material which cannot be saturated by the on or off M.M.F., the output windings 24 will invariably have a finite off level of induced voltage. Note that in FIGURE 1A, curve $I_{dc}>0$ indicates that when $I_s=0$, $V_o$ is a substantial quantity. When the core is switched on, $I_c$ will result in a change in D.C. level in the output circuit at least as great as the peak amplitude of the particular $I_s$ to be applied. This change in level has been found to produce a distinct "thump" which is audible when the circuit is employed with audio equipment and highly objectionable in machine intelligence transfer applications. The "thump" noise is not practically filterable even by capacitive coupling because the frequency components lie in the frequency band which must be passed.

Figure 2:
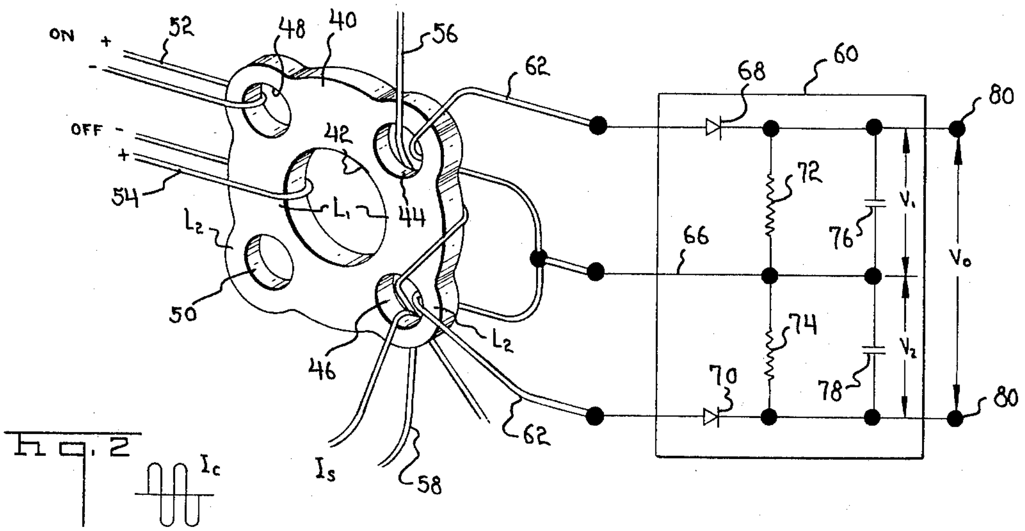
FIGURE 2 is a schematic diagram of the magnetic core switch circuit of the invention in one embodiment.

Referring now to the circuit shown in FIGURE 2, which represents an embodiment of the invention capable of overcoming the above objections, there is included a magnetic switch circuit having a multi-aperture magnetic core 40 including a major aperture 42 and minor aperture 44, 46, 48 and 50 defining paths including legs $L_1$ and $L_2$ as heretofore described. The particular core shown is an enlarged view of a general utility version of a commercially known M.A.D. (multi-aperture device) core. As with the circuit of FIGURE 1, core 40 may be driven to an on or off state by the application of proper current pulses on winding 52 threading aperture 48 and winding 54 threading aperture 42, respectively. When core 40 is in the on state, flux closure will exist about apertures 44 and 46 with flux orientation being opposite in legs $L_1$ and $L_2$ about these apertures as viewed with respect to aperture 42. Also, as above described with respect to FIGURE 1, the application of carrier current $I_c$ to winding 56 will operate to produce an oscillating M.M.F. about each of the apertures 44 and 46 which will switch both remanent and elastic flux about each aperture on each half cycle in the same relative direction, since winding 56 passes down through each aperture. When core 40 is off, the flux switched will be insubstantial including only elastic flux; the core and circuit thus operating in the same manner described with respect to FIGURE 1.

The output circuit of the switch of FIGURE 2 includes a winding 62 threading the apertures in an upward sense, each current passing through one branch of the half wave rectifier circuit in detector 60. Thus, the current induced in the upper half wave rectifier would flow through diode 68 and resistor 72 to lead 66 and the current in the lower half wave rectifier would flow through diode 70 and resistor 74 to combine with the current in the upper unit in lead 66 and return. The application of the negative half cycle of $I_c$ would, of course, be substantially blocked by diodes 68 and 70 in the polarity shown. For each positive half cycle of $I_c$, voltages $V_1$ and $V_2$ will be developed across capacitors 76 and 78 in opposition resulting in an output voltage on winding 80 of $V_0=V_1-V_2$.

Figures 2A, 2B, 2C:
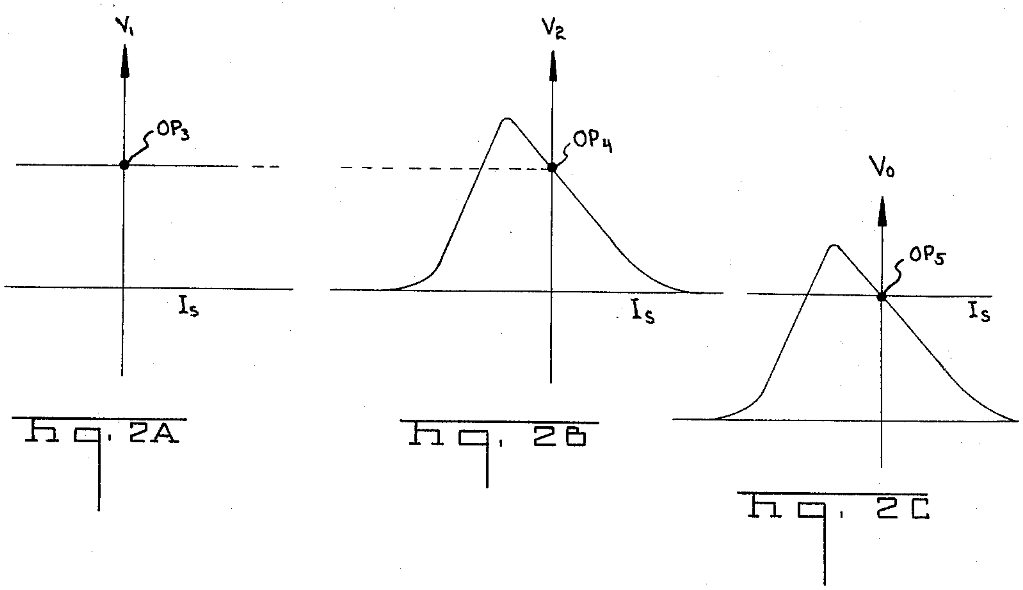
FIGURES 2A–2C are input output characteristic curves of the switch of FIGURE 2.

In the case considered with respect to the circuit of FIGURE 1, it was pointed out that satisfactory operation could be achieved only with asymmetrical drive utilizing the addition of $I_{dc}$ to bias $I_c$ to an operating point wherein the input-output characteristic curve reflected a constant slope intersecting the $I_s=0$ point. It has been discovered that by permitting a small load current to flow in the output winding the need for $I_{dc}$ may be eliminated. Thus, with respect to the circuit shown in FIGURE 2, resistors 72 and 74 may be made such that the current flow above described serves to self-bias $I_c$ producing an effect where by differential loading the flux switched during the positive half cycle of $I_c$ tends to be less than that switched in the negative half cycle thereby causing the output aperture material operating point to reach negative saturation. Thereafter, for any instantaneous value of $I_c$ some corresponding amount of flux will be switched during the positive half cycle and during the subsequent negative half cycle precisely the same amount of flux will be switched back, but at a higher rate. This will in turn produce an asymmetrical output voltage wave form which is proportional to applied drive. Since the applied drive includes $I_s$ when there is a signal present on winding 58, the output voltage detected, $V_0$, will be linearly related to the input signal $I_s$. Considering now the curve shown in FIGURES 2A–2B depicting the input-output characteristic curves for each half of the output circuit and the combination thereof, the advantages above described will be apparent. The curve depicted in FIGURE 2A represents values of $V_1$ for different values of $I_s$; it being apparent that $V_1$ is unaffected by $I_s$. FIGURE 2B depicts values of $V_2$ for different values of $I_s$; the leftward displacement of the curve being achieved by the self-biasing operation above described. FIGURE 2C represents values of $V_0$ for different values of $I_s$; $V_0$ being formed by the addition of $V_1$ and $V_2$ in an opposite sense with an operating point $OP_5$ resulting from the combination of curves including operating points $OP_3$ and $OP_4$. A considerable length of the forward slope of the resultant characteristic curve is thus made available for operation of the switch without the use of an applied $I_{dc}$ and therefore without the need for an additional driver. Since any noise generated in the $I_c$ source will affect both output apertures equally, the voltage components sensed in the output circuit will be effectively cancelled or bucked out by opposition in detector 60. Furthermore, since $V_0$ is substantially zero when $I_s$ is zero, no D.C. level will appear. This, of course, will eliminate the objectionable "thump" or gating noise heretofore described as well as improve the signal to noise ratio of the switch.

To improve even further the on-off ratio of the device shown in FIGURE 2, aperture 46 may be made slightly larger than any of the remaining apertures to provide a minimum cross-sectional area of core material at the aperture driven by $I_s$. This will mean that aperture 44 will include a slightly greater cross-sectional area in which case some sacrifice in the cancellation of D.C. may be expected.

Figure 3:
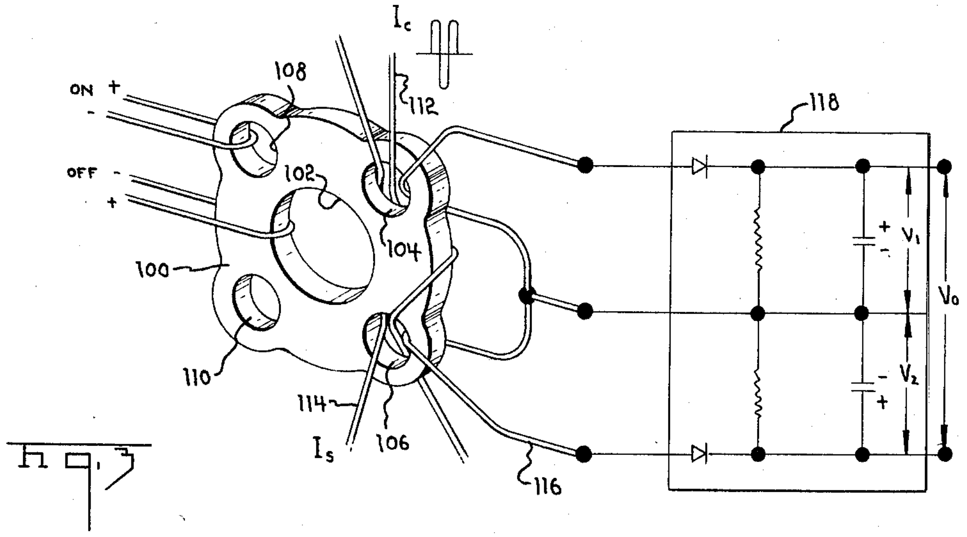
FIGURE 3 is a schematic diagram of the magnetic core switch circuit of the invention in further embodiment.
Figure 3A:
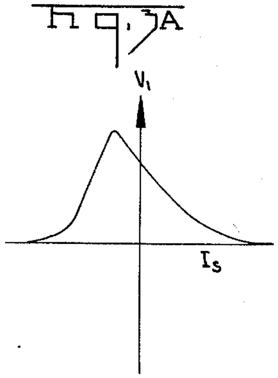
FIGURES 3A–3C are input-output characteristic curves for the switch of FIGURE 3.
Figure 3B:
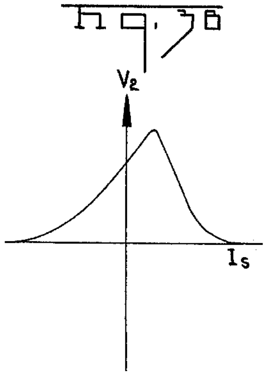
Figure 3C:
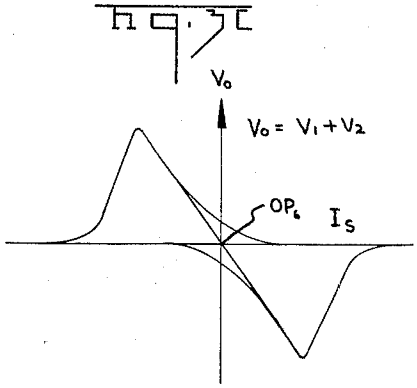

Referring now to a further embodiment of the circuit of the invention, FIGURE 3 shows a magnetic switch capable of an even greater linearity over a broader range of signal amplitude. The switch of FIGURE 3 includes a core 100 having a central major aperture 102 and minor apertures 104, 106, 108 and 110 substantially identical to the core geometry described with respect to FIGURE 2 with the exception that the output apertures 104 and 106 are as close in diameter as possible. The operation of the on-off circuit is the same as heretofore described. Similarly, the drive winding 112 supplying $I_c$ threads the output apertures 104 and 106 in the same relative sense and the output winding 116 also threads the output apertures in the manner shown in FIGURE 2; namely, in a relatively opposite sense. The output detector 118 may also be considered as identical to the detector 60 shown in the circuit of FIGURE 2. The signal input winding 114, however, threads both output apertures 104 and 106 and in an opposite sense; namely, down through one aperture and up through the other aperture with respect to a given half cycle of applied $I_s$. Thus, the M.M.F. produced by $I_s$ will operate to develop flux changes resulting from $I_c$ in an opposite sense to thereby product a different net flux change operating on each portion of winding 116 threading apertures 104 and 106. FIGURES 3A and 3B show the input-output characteristic curves for $V_1$ and $V_2$ respectively, the half wave rectifier circuit responsive to each voltage serving to provide the necessary asymmetry in the manner heretofore described. The respective polarities of the individual halfwave rectifier circuits in detector 118 serve to produce an output voltage as depicted in FIGURE 3C with the individual voltages $V_1$ and $V_2$ in a manner of speaking placed back-to-back. The result of this is that a combined characteristic curve having an operating point $OP_6$ is formed having exceptional linearity and considerable length. Thus, in the same manner of a typical push-pull amplifier, two basically nonlinear devices may be combined to produce a substantially linear operation throughout an extended range.

Figure 4:
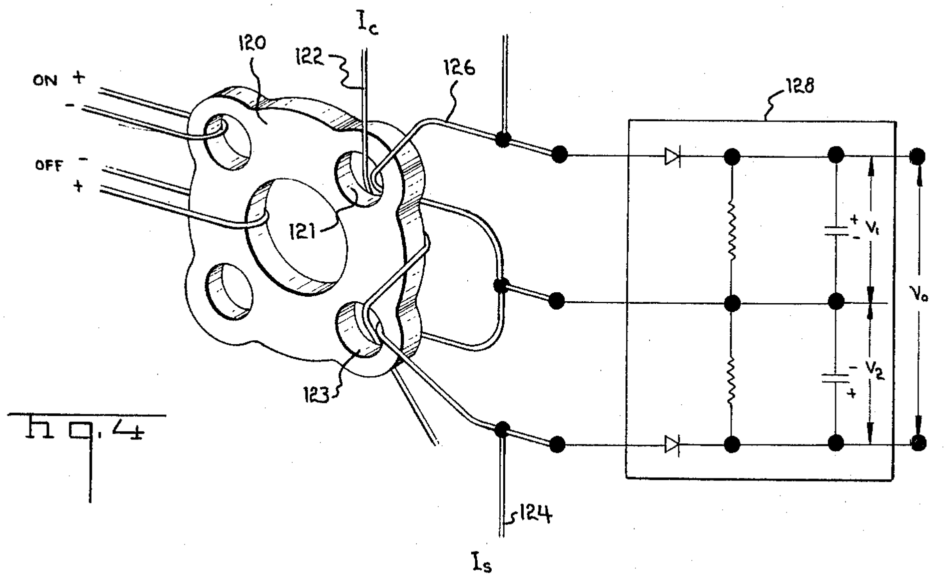
FIGURE 4 is a schematic diagram of a further embodiment of the switch of the invention.

The circuit shown in FIGURE 4 constitutes yet a further embodiment wherein the input signal circuit is combined with the output winding. In this embodiment, core 120 may be considered as identical to core 100 and the on-off circuit identical to that shown in FIGURE 2. The carrier winding 122 supplying $I_c$, threading output apertures 121 and 123 in the same relative sense, the output winding 126 threading apertures 121 and 123 in an opposite sense and detector 128 may be considered as identical to their counterparts in FIGURE 3. The distinction in this embodiment is that input winding 124 feeding $I_s$ is connected directly across the output circuit 126. The operation of the circuit with respect to input-output characteristics is as shown in FIGURES 3A–3C. The circuit of FIGURE 4 achieves the advantages heretofore described with respect to the circuit of FIGURE 3 with the production advantage that only two windings need be threaded through the output minor apertures. In applications utilizing large numbers of magnetic switches having commoned windings this winding simplification is a considerable importance.

Figure 5:
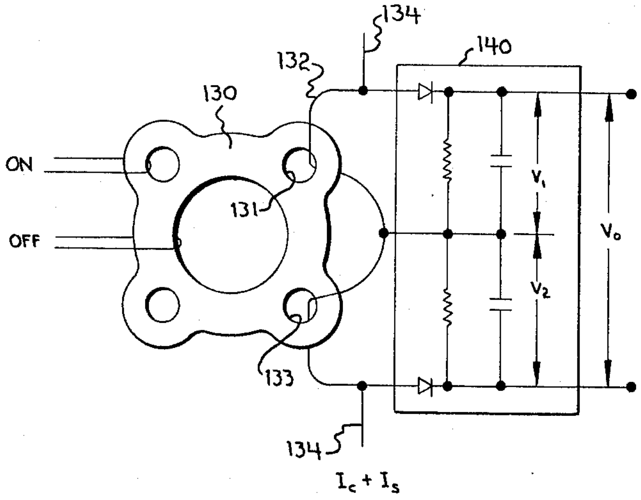
FIGURE 5 is a schematic diagram of an embodiment of the switch of the invention featuring wiring simplifications.

The circuit shown in FIGURE 5 represents a further embodiment of the invention wherein both the input signal circuit and the carrier signal circuit are combined with the output winding circuit. The core 130, the on-off control circuit linking such core and the detector 140 may be considered as identical to the core and circuit described with respect to FIGURE 2. In this embodiment, the output minor apertures 131 and 133 are threaded by a winding 132 passing through each output aperture in the same relative sense with respect to the application of a given polarity of current and interconnected to detector 140. Across winding 132 is an input lead 134 interconnected so that winding 132 serves as both an input and output winding. The input applied to lead 134 includes both $I_c$ and $I_s$ applied in an additive sense to winding 134 and to each of the output minor apertures in the same polarity resulting in net M.M.F. operating to produce output voltages having characteristic curves similar to that shown in FIGURES 3A, 3B and 3C. As will be appreciated, the ability to combine $I_c$, $I_s$ and output functions so that a single winding is necessary is especially important where relatively small apertures are used. The circuit of FIGURE 5 thus offers still further cost savings over the embodiments heretofore shown.

Figure 6:
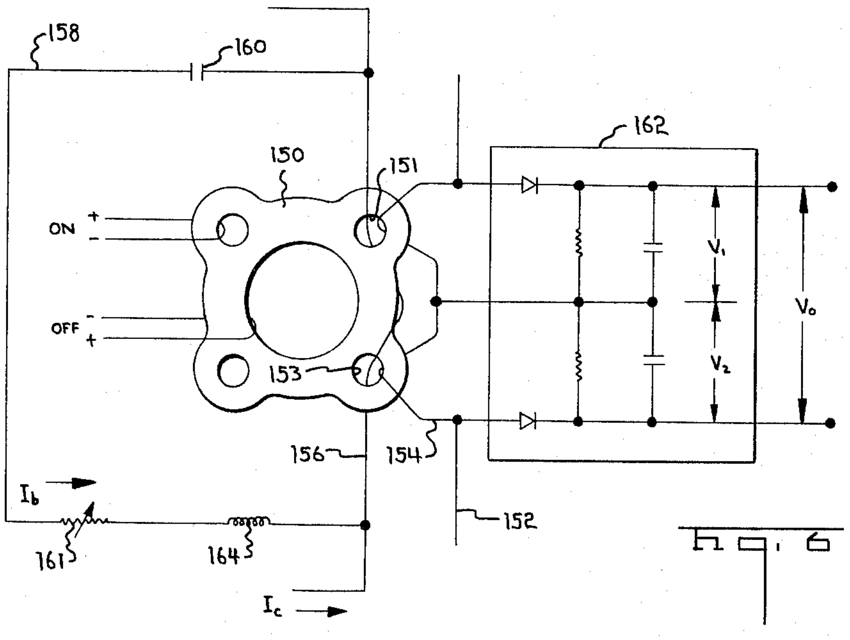
FIGURE 6 is a schematic diagram of an embodiment of the switch of the invention featuring a novel scheme of gain control.
Figure 7:
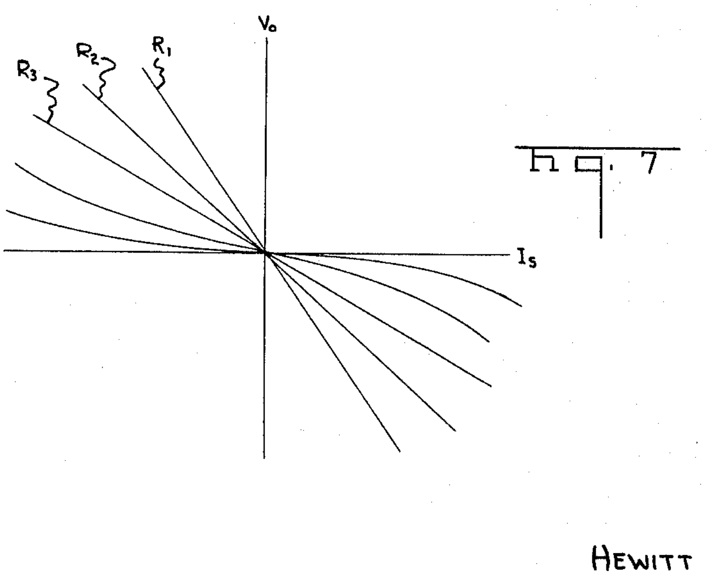
FIGURE 7 is an input-output characteristic curve included to show the operating capability of the invention with respect to gain control.

Turning now to FIGURE 6 there is shown a circuit drawn to an aspect of the invention which may be utilized with any of the foregoing circuits to achieve gain control. In this embodiment core 150, the on-off control circuit, the output winding 154 threading output apertures 151 and 153 in an opposite sense, and the detector 162 are as shown with respect to FIGURE 4. Leads 152 are connected across the output winding 154 to supply the intelligence signal $I_s$ and a winding 156 is provided threading the output apertures 151 and 153 in the same sense to supply $I_c$. Connected across winding 156 is a circuit 158 including in series battery 160, variable resistance element 161 and inductance element 164. The polarity of the circuit 158 is such as to achieve a current flow up through both minor output apertures 151 and 153 with respect to the turns shown in FIGURE 6. The resulting current flow $I_b$ may be controlled by adjustments of variable resistance element 161 with inductance element 164 acting as a low pass filter. As will be readily understood, the application of $I_b$ will tend to reenforce $I_c$ in one polarity and subtract therefrom in the other polarity with the result of biasing $I_c$ to form an asymmetrical drive applied to the output apertures of core 150 in the manner of $I_{dc}$ with respect to FIGURE 1. It has been found that different settings of 161 resulting in distinctly different levels of $I_b$ and in a different symmetry of the effective drive $I_b+I_c$ vary the switching gain without distortion by varying the slope of the $V_0-I_s$ characteristic curve. This is shown in FIGURE 7 wherein at least three distinct curves $R_1$, $R_2$ and $R_3$ are achieved by three distinct settings of 161. Each of these curves offers a relatively long linear portion of stable operation wherein different amounts of gain may be achieved.

For general applications, the core and circuit components may be selected in the manner above described to provide a magnetic switch capable of extremely stable on-off operation with a relatively high on-off ratio. These circuits will provide an output voltage which is a linear function of a given input signal with minimum gating level or driver noises produced at the output channel. The use of one circuit as against the other will, of course, be dictated by particular application being considered. For example, in circuits wherein the number of turns utilized for $I_c$ and $I_s$ differ, the embodiments shown in FIGURE 2 and FIGURE 3 may be preferred. On the other hand, the embodiments wherein the number of turns for $I_c$ and $I_s$ differ but the number of turns for the output winding are the same as that required for $I_s$ then the embodiment of FIGURE 4 may be preferred.

For general operation the values of detector components and driver current value levels may be selected to provide a desired gain. Alternatively, the embodiment featuring gain control shown in FIGURE 6 may be incorporated with any of the other embodiments if so desired; the similarity or dissimilarity of number of turns of $I_c$, $I_b$ or $I_s$ operating to establish whether separate windings or common windings will be utilized. In either case, the advantages of the magnetic switch of the invention are not lost since the balancing feature operates in the same manner.

It is contemplated that switching circuits such as shown in FIGURES 2, 3, 4, 5 and 6 may be used individually or in large numbers in a variety of switching applications. When used in large numbers it is contemplated that circuit simplification may be achieved by commoning the on-off windings threading different cores in typical *xy* coordinate fashion. In a similar manner, input or output windings may be commoned to a single detector per *x* or *y* row by merely applying the particular input or output winding as shown in FIGURES 2–6 to similar portions of each core in series.

It is also contemplated that other structures may be employed. For example, cores of different material may be used having the basic square loop characteristic but with a different flux content; the operational difference being compensated by different turns ratios in a standard manner. Similarly, cores of different geometry may be utilized including composite cores defining numerous cores having paths similar to the cores shown in FIGURES 2–6.

In an actual unit constructed in accordance with the invention in the embodiment shown in FIGURE 3, a magnetic core was employed utilizing saturable ferrite material manufactured by Indiana General Corporation of Keesby, New Jersey and identified as their material No. 5209. The on-off windings included 3 and 5 turns, respectively, of No. 38 A.W.G. Formvar wire supplied by pulse sources producing pulses of approximately 1 amp amplitude and 5 micro-seconds duration, respectively. The $I_c$ carrier winding included 2 turns threading each of the core output apertures with 40 A.W.G. Formvar wire connected to a 300 kc. R.F. source, the output windings included 6 turns of 40 A.W.G. Formvar wire linking each aperture. The detector employed included diodes identified as 1N100; resistors 1000 ohm and capacitors .01 microfarad. The switch operated to interconnect an audio input signal to drive an audio channel without substantial switching noise or distortion throughout a frequency range from D.C. to 30 kc.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. An improved magnetic switch for controllably interconnecting intelligence channels including a saturable magnetic material structure having a geometry defining distinct paths of flux closure, means adapted to switch flux in said paths including a carrier signal source linking both said paths and an intelligence signal source linking at least one of said paths, means adapted to produce distinct voltages responsive to flux switched to each said path and means for differencing said distinct voltages to produce an output voltage linearly related to the intelligence signal.

2. The switch of claim 1 wherein the said means for differencing said distinct voltages includes a means operable to provide currents partially opposing flux switched in said paths.

3. The switch of claim 1 wherein said means for differencing said distinct voltages comprises a pair of half-wave rectifiers connected to said means adapted to produce distinct voltages.

4. The switch of claim 1 wherein there is further included means linking a portion of said magnetic material structure and adapted to drive the structure into either a high or low threshold condition, the particular condition blocking or permitting substantial flux to be switched in said paths responsive to said means adapted to switch flux.

5. The switch of claim 1 wherein said means adapted to switch flux in said paths further includes means operable to bias the carrier signal produced by said carrier signal source into distinct levels of asymmetry with each distinct level resulting in a different quantity of flux switched in said paths and a distinct output voltage for each level for the purpose of gain control.

6. An improved method of operation of magnetic core switches of the type employed to interconnect communication channels including the steps of applying a rapidly oscillating carrier magnetomotive force to first and second portions of a magnetic core sufficient to switch substantial flux in each portion, applying a further magnetomotive force representative of an intelligence signal to modulate said carrier magnetomotive force and the flux switched thereby in at least one portion, developing an induced voltage proportional to the flux switched by said carrier and further magnetomotive force in each portion, and combining the voltages of each portion in a sense to eliminate voltage components attributable to flux switched by the carrier magnetomotive force and produce an output voltage representative of the input signal.

7. The method of claim 6 including the further step of biasing said carrier magnetomotive force to distinct levels to switch at different rates substantial levels of flux in each said portion to result in different levels of output voltage for a given level of input signal for gain control.

8. The method of claim 1 including the further step of applying a magnetomotive force to each portion of core material to drive each portion into a relatively high threshold condition such that the resultant magnetomotive force of the carrier and further magnetomotive force is less than sufficient to switch substantial flux in either of the portions.

9. An improved method of obtaining linearity in magnetic core switches of the type employed to controllably interconnect communication channels including the steps of applying a rapidly oscillating carrier magnetomotive force to core material sufficient to switch substantial flux in such material, applying a further magnetomotive force representative of an intelligence signal to modulate the carrier magnetomotive force and the flux switched thereby, developing separate induced voltages proportional to the flux switched by the carrier and further magnetomotive force, developing currents related to the induced voltages, applying such currents to produce magnetomotive forces biasing the applied magnetomotive force to switch flux asymmetrically and combining the induced voltage in a sense to produce an output voltage linearly related to the input signal.

10. An improved method of operation of magnetic core switches of the type employed to controllably interconnect communication channels including the steps of applying a rapidly oscillating carrier magnetomotive force to distinct portions of core material sufficient to switch substantial flux therein; applying a further magnetomotive force representative of an intelligence signal to modulate the carrier magnetomotive force and the flux switched thereby in each portion, developing first and second induced voltages proportional to the flux switched by the carrier and further magnetomotive force in each portion, developing first and second currents related to the induced voltages; applying the magnetomotive force resulting from the first and second currents to bias the applied magnetomotive force to switch flux asymmetrically in each portion, and combining the first and second voltages in a sense to produce an output voltage which is linearly related to said intelligence signal.

11. An improved magnetic switch of the type utilized to interconnect communication channels including defined paths of saturable magnetic material capable of being driven into distinct states of magnetization representative of high and low material threshold conditions, means linking the paths and adapted to drive the material into either the high or low threshold condition, means linking the paths with a carrier magnetomotive force adapted to develop a substantial and rapidly reversing flux in the material when such material is in the low threshold condition; means linking the paths and adapted to modulate the carrier magnetomotive force and the flux switched thereby with an intelligence signal, means linking the paths and adapted to respond to flux changes therein to produce a current providing an magnetomotive force biasing the said flux changes asymmetrically, means responsive to flux changes to produce an output signal and detector means including paths adapted to effectively cancel voltage components attributable to changes in threshold conditions and due to flux switched by the carrier magnetomotive force.

12. The switch of claim 11 including further means linking the said paths with a magnetomotive force biasing said carrier magnetomotive force, the said further means including control means adapted to change the level of said magnetomotive force and thereby the level of said carrier magnetomotive force whereby said substantial and rapidly reversing flux may be switched at different rates to produce different levels of output signal for a given input signal in a controlled manner.

13. An improved switch circuit comprising a multi-aperture magnetic core having two minor apertures and having distinct stable states of magnetization representative of on or off conditions, means linking the core and adapted to drive the core into either the on or off conditions, means linking each of the minor apertures in the same relative sense including a source of magnetomotive force sufficient to repeatedly reverse substantial flux around each aperture when the core is in its on condition, an input signal means linking at least one of the apertures and adapted to produce a magnetomotive force modulating the former magnetomotive force responsive to an input signal, an output circuit including means linking each aperture in an opposite sense and adapted to respond to flux changes about each aperture to develop output voltages related to flux changes about each aperture, the output circuit further including means to combine said voltages in a manner to cancel the voltage components due to flux changes caused by said first mentioned magnetomotive force and by said core being driven into the on or off conditions.

14. An improved magnetic switch circuit adapted to controllably transfer or block an intelligence signal including a magnetic core having a major aperture and two minor apertures each defining paths of possible flux closure, means for driving the core into a relatively high threshold condition and means for driving the core into a relatively low threshold condition, the respective conditions representing on or off switch states, means for applying a radio frequency signal to each minor aperture in the same sense sufficient to produce a substantial flux reversal about each aperture when the core is in the low threshold condition but insufficient to produce a substantial flux reversal about each aperture when the core is in the high threshold condition, an input signal means linking at least one of the minor apertures and adapted to produce flux changes modulating the above-recited flux changes, output means linking each aperture in an opposite sense and adapted to produce voltages related to each aperture responsive to flux changes about each aperture, the output means further including means for combining said voltages in a sense to produce an output voltage linearly related to said input signal.

15. The switch circuit of claim 14 wherein the output means includes a path permittng current flow to produce a magnetomotive force biasing the applied magnetomotive force at each aperture.

16. An improved magnetic core switch circuit including a multi-aperture magnetic core having distinct stable states each representative of on and off switch conditions, first winding means linking the core and adapted to drive the core into the on condition and second winding means linking the core and adapted to drive the core into the off condition, a further winding linking the core and adapted to produce carrier oscillating flux localized in two distinct portions of the core, an input winding linking at least one of the core portions with an intelligence signal to produce a flux modulatng the flux oscillating in at least one of the portions, an output winding linking the two portions of the core in an opposite sense, a detector circuit connected to said output winding including a half-wave rectifier for each portion capable of developing a voltage proportional to flux changes in each respective portion and further including means to combine the developed voltages to eliminate the signal components produced by the core beng driven from the on or off condition and further eliminate signal components produced by the carrier oscillating flux.

17. An improved magnetic core switch circuit including a multi-aperture magnetic core having distinct stable states each representing on and off switch conditions, first winding means linking the core and adapted to drive the core into the on condition and second winding means linking the core and adapted to drive the core to the off condition, a further winding linking the core and adapted to produce an oscillating flux localized in two distinct portions of the core, an input winding linking the two distinct portions of the core with an intelligence signal to produce a flux modulating the oscillating flux in the distinct portion, of the core output inding linking the two distinct portions of the core in an opposite sense, a detector circuit connected to the output winding including a half-wave rectifier for each portion capable of developing a voltage proportional to flux changes in each respective portion and further including means to combine the developed voltages to eliminate signal components produced by the core being driven from the on or off condition and further eliminate signal components produced by the first mentioned oscillating flux.

18. An improved magnetic core switch circuit including a multi-aperture magnetic core having distinct stable states each representative of on and off switch conditions, first winding means linking the core and adapted to drive the core into the on condition, and second winding means linking the core and adapted to drive the core to the off condition, a further winding linking the core and adapted to produce a carrier oscillating flux localized in two distinct portions of the core, an output winding linking the two portions of the core in an opposite sense, an input lead connected to said output winding and adapted to produce a flux modulating the flux oscillating in said distinct portions in proportion to an intelligent signal applied thereto, a detector circuit connected to said output winding including half-wave rectifiers for each portion each capable of developing voltages portional to the flux changes in each respective portion and further including means to combine the developed voltages to eliminate the signal components produced by the core being driven to the on or off condition and to further eliminate signal components produced by the carrier oscilalting flux.

19. A improved magnetic core switch circuit including a multi-aperture magnetic core having distinct stable states each representative of on and off switch conditions, first winding means linking the core and adapted to drive the core into the on condition and second winding means linking the core and adapted to drive the core into the off condition, further winding linking the core about two distinct portions thereof to form an input and output winding, an input lead connected to said further winding and to a carrier signal source and an intelligent signal source, the carrier signal producing an oscillating flux in said two distinct portions of the core and the intelligent signal producing a flux modulating the flux oscillating in said two distinct portions of the core, a detector circuit connected to the further winding including a half-wave rectifier for each distinct portion capable of developing a voltage proportional to flux changes in each respective portion and further including means to combine the developed voltages to eliminate signal components produced by the core being driven from the on or off condition and to further eliminate signal components produced by the carrier oscillating flux.

20. The magnetic core switch circuit of claim 19 further including a gain control circuit interconnected across said further winding comprising a current source and means for adjusting such current source to bias said carrier signal to different levels of asymmetry.

21. An improved magnetic switch circuit including a multi-aperture core capable of being driven by applied magnetomotive force into distinct stable states representative of on and off conditions, means to drive the core into the on condition, means to drive the core into the off condition, means for producing a rapidly reversing carrier magnetomotive force acting on distinct portions of the core in the same relative sense, means for impressing on one of said portions a magnetomotive force representative of intelligence, an output means linking each core in an opposite sense including a circuit path adapted to produce a magnetomotive force biasing the said magnetomotive force in each portion, a detector means connected to said output means including a circuit path adapted to interconnect equal and opposite signals responsive to voltages induced by flux changes occurring in each portion due to the carrier magnetomotive force and further adapted to produce an output signal representative of the voltage induced by flux changes in the one portion due to the impressed magnetomotive force coupled by the said input means.

22. The combination of claim 21 wherein the detector means includes first and second parallel paths each having a blocking diode therein and each having a common connection to a third path through a capacitor and resistance in parallel.

23. An improved magnetic switch circuit including a multi-aperture core capable of being driven by applied magnetomotive force into distinct stable states of magnetization representative of on and off conditions respectively, means to drive the core into the on condition and means to drive the core into the off condition, means for producing a rapidly reversing magnetomotive force acting on distinct portions of the core in the same relative sense and means for impressing on the said distinct portions of the core a reversing magnetomotive force representative of intelligence, an output means linking each core portion in an opposite sense including a circuit path adapted to provide a magnetomotive force biasing the first mentioned magnetomotive force to cause asymmetrical switching of flux in each portion and further including a circuit path adapted to interconnect voltages induced by flux changes occurring in each portion to produce an output signal representative of the voltage induced by flux changes in the paths due to the magnetomotive force component representative of intelligence.

24. The combination of claim 11 wherein the means for impressing the intelligence magnetomotive force is commoned with the output means.

References Cited by the Examiner

UNITED STATES PATENTS

| | | | |
|---|---|---|---|
| 2,884,622 | 4/1959 | Raschman | 340—174 |
| 2,921,136 | 1/1960 | Cooke | 340—174 |
| 3,128,434 | 4/1964 | Moreines | 340—174 |
| 3,197,745 | 7/1965 | Sweeney | 340—174 |
| 3,226,698 | 12/1965 | Mahoney | 340—174 |

BERNARD KONICK, *Primary Examiner.*

G. LIEBERSTEIN, *Assistant Examiner.*